(12) United States Patent
Moraru et al.

(10) Patent No.: US 10,528,861 B2
(45) Date of Patent: Jan. 7, 2020

(54) RADIO-FREQUENCY IDENTIFICATION TRANSPONDER FOR AGGRESSIVE ENVIRONMENTS

(71) Applicant: PROMAR TEXTIL INDUSTRIES S.R.L., Brasov (RO)

(72) Inventors: Aurelian Moraru, Brasov (RO); Corneliu Ursachi, Brasov (RO)

(73) Assignee: PROMAR TEXTIL INDUSTRIES S.R.L., Brasov (RO)

( * ) Notice: Subject to any disclaimer, the term of this patent is extended or adjusted under 35 U.S.C. 154(b) by 0 days.

(21) Appl. No.: 16/305,544

(22) PCT Filed: Nov. 7, 2017

(86) PCT No.: PCT/RO2017/000021
§ 371 (c)(1),
(2) Date: Nov. 29, 2018

(87) PCT Pub. No.: WO2018/124906
PCT Pub. Date: Jul. 5, 2018

(65) Prior Publication Data
US 2019/0279068 A1    Sep. 12, 2019

(30) Foreign Application Priority Data
Nov. 7, 2016 (RO) ..................... 16-0791

(51) Int. Cl.
*G06K 19/077* (2006.01)

(52) U.S. Cl.
CPC ... *G06K 19/07777* (2013.01); *G06K 19/0775* (2013.01); *G06K 19/07728* (2013.01)

(58) Field of Classification Search
CPC ....... G06K 19/07777; G06K 19/07728; G06K 19/0775
See application file for complete search history.

(56) References Cited

U.S. PATENT DOCUMENTS 7,432,816 B1    10/2008    Ku et al.
8,638,193 B2 *   1/2014    Margalef ......... G06K 19/07749
                                                      340/10.1

(Continued)

FOREIGN PATENT DOCUMENTS

| EP | 2405054 A1 | 1/2012 |
|---|---|---|
| WO | WO 00/21030 * | 4/2000 |
| WO | 2012014005 A1 | 2/2012 |

OTHER PUBLICATIONS

International Search Report of PCT/RO2017/000021 Completed Apr. 19, 2018; dated May 5, 2018 5 pages.

(Continued)

*Primary Examiner* — Laura A Gudorf
(74) *Attorney, Agent, or Firm* — The Roy Gross Law Firm, LLC; Roy Gross

(57) ABSTRACT

The present invention relates to an encapsulated RFID (Radio Frequency Identification) transponder for the UHF-SHF range, designed to operate in aggressive industrial environments. The encapsulated RFID transponder is composed of an integrated circuit in an SOT 323 package, a near-field antenna made on a printed circuit substrate, electrically connected to the integrated circuit by the use of surface mounting technology, all of which encapsulated in an electrically insulating material, resistant to chemical, mechanical, pressure, and thermal stresses.

9 Claims, 2 Drawing Sheets

(56) References Cited

U.S. PATENT DOCUMENTS

2015/0028107 A1 1/2015 Fischer et al.
2016/0048751 A1 2/2016 Imbruglio

OTHER PUBLICATIONS

Written Opinion of PCT/RO2017/000021 Completed Apr. 19, 2018; dated May 5, 2018 6 pages.

* cited by examiner

RADIO-FREQUENCY IDENTIFICATION TRANSPONDER FOR AGGRESSIVE ENVIRONMENTS

RELATED APPLICATIONS

This application is a National Phase of PCT Patent Application No. PCT/RO2017/000021 having International filing date of Nov. 7, 2017, which claims the benefit of priority of Romanian Application No. a 2016 00791 filed on Nov. 7, 2016. The contents of the above applications are all incorporated by reference as if fully set forth herein in their entirety.

The present invention relates to the field of radio frequency identification (RFID) systems in which, by attaching some electronic devices, monitored objects are assigned a unique identity that they communicate wirelessly, via electromagnetic field in radio frequency range, to a Reader-Interrogator, when they are in its radius of action. It is thus possible to develop applications for identification, tracking, inventory, cryptography, security.

Figure 1:
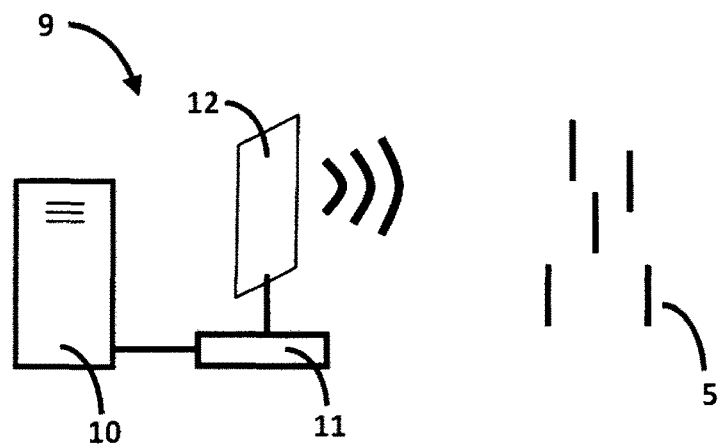

Any RFID system 9 (FIG. 1—state of the art) must have at least a Reader 11 having an internal or external antenna 12, an identification electronic device usually called RFID Tag 5, attached to the monitored object, and a Host computer 10 connected to the Reader 11. The RFID Tag 5, generally consists of an integrated circuit 3, electrically connected to an antenna and can be active when it has his own source of electricity, or passive, when it is energised by the Reader 11.

Any RFID Tag 5 must have an integrated circuit and an antenna. Depending on the frequency range, the RFID Tag 5 and implicitly the contained antenna, have different performances, shapes and sizes. In HF band, RFID systems have a range of action below one meter, and the RFID Tag antenna has a plane coil-like shape. In UHF-SHF band, RFID systems have 3-7 m range of action, or even hundreds meters for active tags, and the RFID Tag antenna has a dipole shape. The information is transmitted from the RFID Tag antenna to the Reader by load modulation in HF range, and by backscattering in UHF-SHF range.

FIG. 2a presents a RFID Tag 5, designed to operate in UHF domain. To achieve maximum power transfer between UHF antenna 6 and integrated circuit 3 it is necessary to introduce, among them, a matching impedance structure 8. The UHF antenna 6 and matching impedance structure 8, are made from an electro conductive material in the form of metallic wire, electro conductive yarn, PCB trace or printed conductive structures. The integrated circuit 3 is electrically connected to the matching impedance structure 8. All of them are placed on an electric isolating substrate 7.

The integrated circuit 3, with extremely small dimensions (with sizes down to 50×50 µm) must be electrically connected to the massive assembly formed by the UHF antenna 6 and the matching impedance structure 8 (70 mm long, 15 mm wide, 0.5-1 mm trace width). There is an obvious discrepancy between the dimensions of the two components.

The electric connection points between the integrated circuit 3 and the massive assembly formed by the UHF antenna 6 and the matching impedance structure 8, are the critical points (weak points) of the RFID Tag 5, especially when it is subjected to chemical, mechanical, pressure and thermal stresses as in industrial laundries or other harsh environments. These connection points must be protected and the RFID Tag 5 is more robust as the number of these points is lower.

Figure 2:
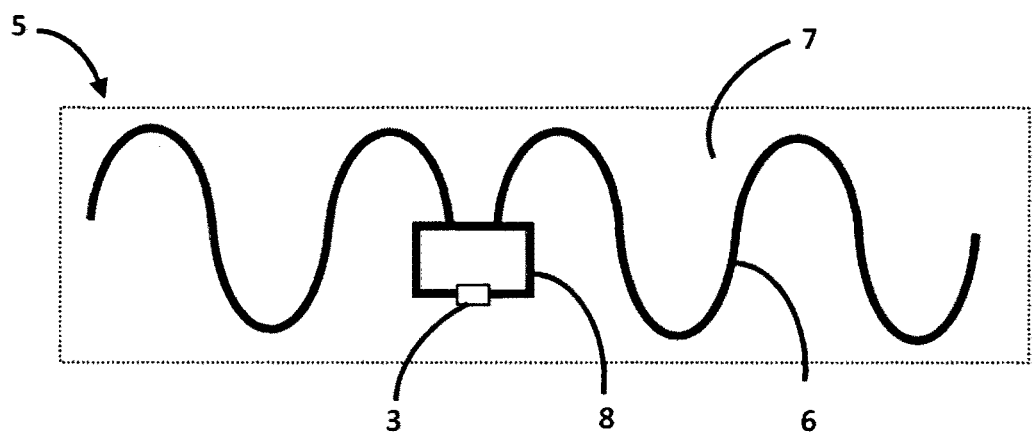
Figure 2:
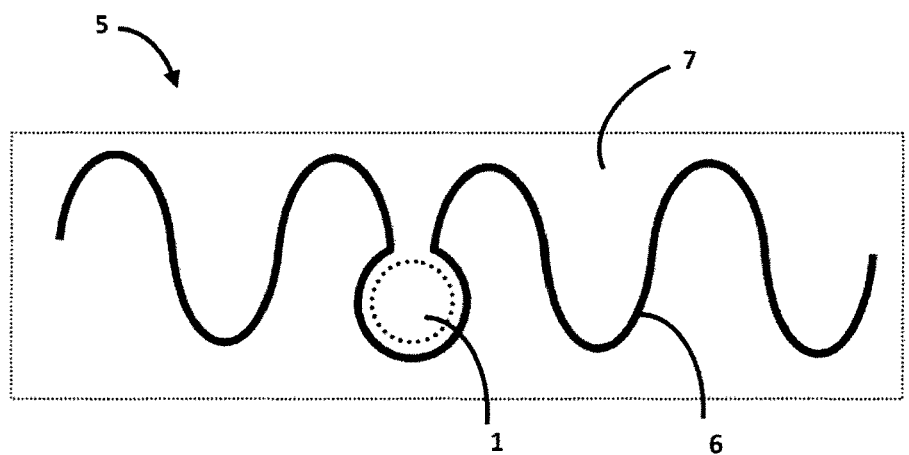

In accordance with the present invention, for harsh environments it has been adopted a new design (FIG. 2 b). The RFID Tag 5 has been broken into two parts, a UHF antenna 6 easily achieved from electric wires, electro conductive yarns or by printed electroconductive structures, that require just a soft protection, and an independent encapsulated (protected to harsh environments) transponder 1, the RFID seed. These two parts inductively coupled, create an UHF RFID Tag 5, having a 3-5 meters range of action.

Figure 3:
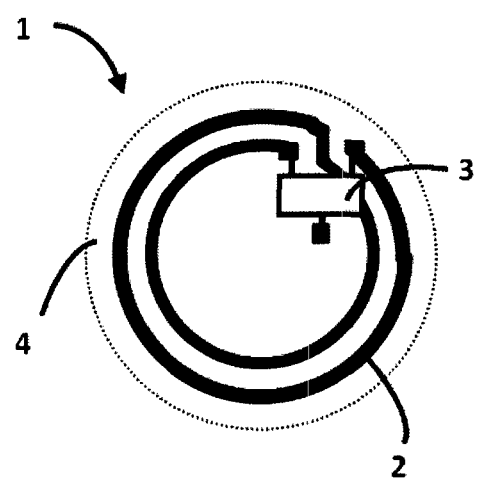

As shown in FIG. 3, the RFID transponder 1 comprises the integrated circuit 3 connected to a small near field antenna 2 in the form of a flat circular loop or spiral with two windings forming two concentric circles in which the free end of the inner winding is connected to a first electrically operating pin of the SOT323 housing, and the free end of the outer winding is connected to a second electrically operating pin of the SOT323 housing located on the same side of the SOT323 housing as the first functional electrical pin. It can work independently in short read range application, or inductively coupled to a nearby far field UHF antenna, in long read range application (3-5 m). The RFID seed 1 has in one preferred embodiments a flat round shape, with the diameter below 10 mm, and about 1 mm thick.

The design described above was used for the encapsulated transponder proposed by the EP 2 405 054 A1 patent. The encapsulated transponder consists of an integrated circuit electrically connected to a near field antenna. It has a circular shape, and, by its own near field antenna, is inductively coupled to an UHF far field antenna which surrounds at least half of its circumference, particularly two-thirds or even the entire circumference.

In the DE 102007026720 A1 patent, which follows the same type of design, the encapsulated transponder, called "chip module" has a patch-like shape, and is built on a flexible plastic substrate, the integrated circuit and the near field antenna are covered by protective sheets. The "chip module" is attached over a UHF far field meandered dipole antenna, which couples inductively.

Used in harsh environments, even encapsulated transponders are destroyed by interrupting the electrical contacts between the integrated circuit and the near field antenna.

The patents US 20070095926 A1 and EP 20405 054 A1 had described an independent transponder with a near field planar spiral antenna, but both of them electrically connect the two RF pads of the RFID integrated circuit to the ends of the spiral antenna by conductive straps. By doing so, there will be four points of electrical contact, two between a pad of the RFID integrated circuit and one end of the near field antenna, and two for the other pad. There will be four weak points of the design (A, B, C, D points in FIG. 4a). Also, at repeatable temperature variation, the strap can behave like a bimetal, interrupting electrical contact between the integrated circuit and the near field antenna, and the tagged item will lose its identity.

To achieve the important target, for the number of connection points to be minimal and to remove from the transponder construction the straps that behave like bimetals at repeated temperature variations, the present patent, by choosing a larger integrated circuit package, SOT 323, allows a particular near field antenna geometry (FIG. 4b) that eliminates the strap, reducing to two, the minimum possible, the number of contact points.

In a first aspect, the present invention provides an RFID transponder intended for operation in the UIF or SIF frequency range comprising an integrated circuit mounted in a SOT 323 package, a near-field field antenna connected electrically using surface mounting technology in two points to the integrated circuit, the assembly of the integrated circuit and the near field antenna being encapsulated in an electrically insulating material, characterized in that the near field antenna, in the form of a planar spiral composed of two concentric circles, the passage from the inner circle on the outer circle is made in an appropriate manner by bypassing the fixing pin (with no electrical role) of the integrated circuit and then passing between the other two pins while keeping the circular shape of the two loops without deviations from it.

Other preferred features of the RFID transponder according to the present invention are the subject of dependent claims 2-4.

In another aspect, the present invention provides an RFID tag comprising an IDRF transponder according to the invention inductively coupled to a UHF antenna made of conductive wire or printed electroconductive structures.

For a more complete understanding of the present invention and its advantages, reference is made now, by way of example, to the following brief description of the accompanying drawings and to the detailed description:

FIG. 1 RFID system

FIG. 2 *a*. An RFID UHF Tag, having the integrated circuit 3 galvanically connected to the UHF antenna 6 by a matching structure 8

FIG. 2 *b*. UHF Tag, having a RFID transponder 1 inductively coupled to the UHF antenna 6

FIG. 3. RFID transponder

Figure 4:
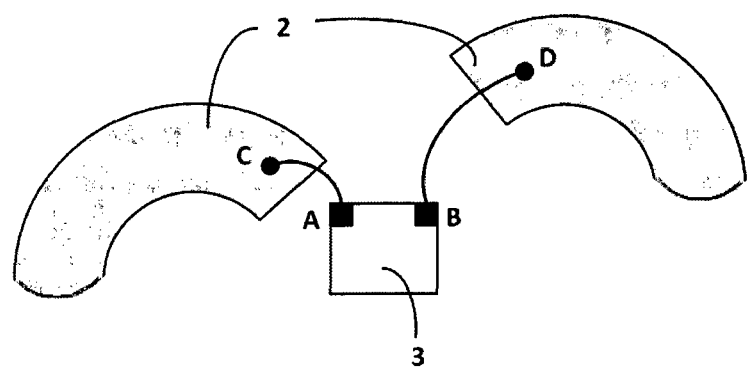
Figure 4:
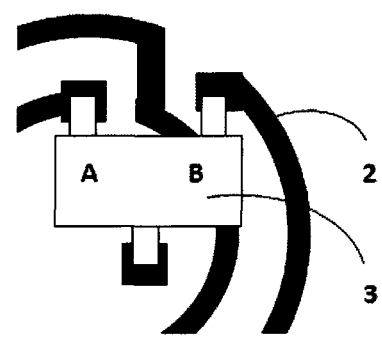

FIG. 4*a*. Connecting the integrated circuit 3 to the near field antenna 2, by two straps and four connection points FIG. 4*b*. Detail of FIG. 3 Connecting the integrated circuit 3 to the near field antenna 2, in two points In the context of the present invention, and as is well known in the art, a SOT (Small Outline Transistor) 323 package is a housing for electronic components having three pins arranged in a configuration in which two (with a functional role) on one side and one (only with fixation role) on the opposite side, as well as in FIG. 4*a*.

The electrical connections between the integrated circuit 3 and the near field antenna 2 are made in surface mount technology. By using SOT 323 package, the integrated circuit 3 pins are significantly bigger than those of bumped die version of the integrated circuit, and allow welding electrical contacts. Welded electrical contacts are more resilient to mechanical stresses, are chemically stable and have high durability in processes with repeated temperature variations characteristic of aggressive industrial environments.

The near field antenna 2 (FIG. 4*b*) is a small form factor flat planar spiral that passes between integrated circuits 3 legs It is built in the technology of printed circuits on a thin PCB and it has an external diameter of about 5 mm.

The Integrated circuit 3-spiral near field antenna 2 assembly, will be encapsulated in a dielectric 4, chemically stable and mechanically resistant, thermally insulating material and then cut into round-shaped pills, resulting in the RFID transponder 1.

The RFID seed 1, can be attached and fixed to objects that it identifies, in cavities, glued or laminated on their surface, or in a pocket, hem, liner of a garment by, e.g., sewing, and it can operate as a standalone device in applications where objects are read within the close proximity of the Reader. It can be attached too, by the same methods, nearby a previously made external UHF antenna on the identified items, and also works in applications requiring a reading area of meters (3-5 m).

The present patent, by designing a particular geometry of the near-field antenna 2, manages to connect it to the integrated circuit 3 at two electrical connection points, minimum possible. The electrical connections are made by welding resulting in a robust and reliable electronic device.

The invention claimed is:

1. A radiofrequency identification (RFID) transponder intended for operation in the ultra-high frequency (UHF) or super-high frequency (SHF) range comprising:
    an integrated circuit mounted in a small outline transistor (SOT) 323 package comprising a fixing pin having no electrical role and two other pins, a near field antenna connected electrically using surface mounting technology in two points to the SOT323 package, the assembly of the SOT323 package and the near field antenna being encapsulated in an electrically insulating material,
    wherein the near field antenna is in the form of a planar spiral composed of two concentric circles including an inner circle and an outer circle,
    wherein the space between the inner circle and the outer circle is crossed by bypassing the fixing pin of the SOT323 package and then passing between the other two pins while keeping the circular shape of the two concentric circles with very small deviations from the circular shape of the two concentric circles.

2. The RFID transponder according to claim 1, wherein the near field antenna is made by circuitry printed circuits technology on a thin printed circuit board and has a diameter of about 5 mm.

3. The RFID transponder according to claim 1, wherein the RFID transponder has a rounded flat shape with a diameter of less than 10 mm and a thickness of less than 1 mm.

4. The RFID transponder according to claim 1, wherein said material is resistant to chemical, mechanical, pressure and thermal stress.

5. An RFID tag comprising an RFID transponder according to claim 1, inductively coupled to a UHF antenna made from conductive wire or printed electro conductive structures.

6. The RFID tag according to claim 5, wherein the RFID tag allows reading from a distance of about 3-5 m.

7. An RFID tag comprising an RFID transponder according to claim 2, inductively coupled to a UHF antenna made from conductive wire or printed electro conductive structures.

8. An RFID tag comprising an RFID transponder according to claim 3, inductively coupled to a UHF antenna made from conductive wire or printed electro conductive structures.

9. An RFID tag comprising an RFID transponder according to claim 4, inductively coupled to a UHF antenna made from conductive wire or printed electro conductive structures.

* * * * *